Feb. 4, 1941.    S. L. WINSLOW    2,230,315
ORTHODONTIC APPLIANCE
Filed April 21, 1939    2 Sheets-Sheet 1
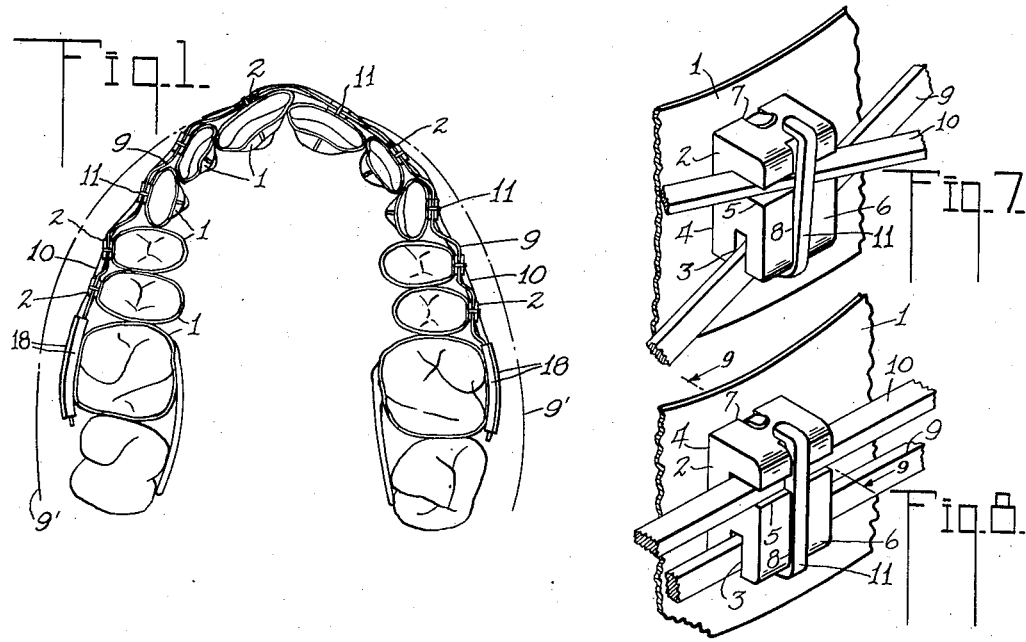
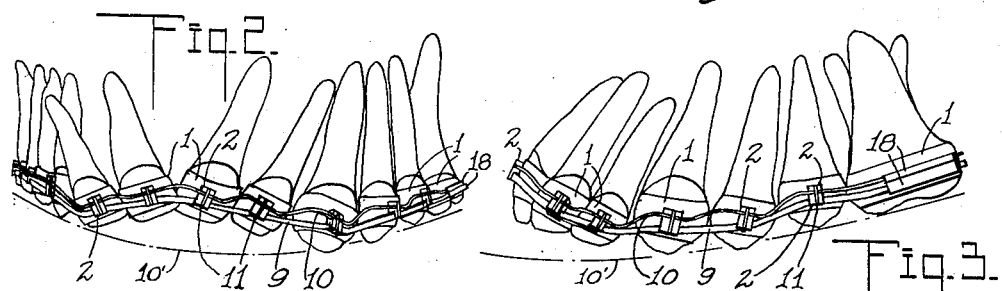
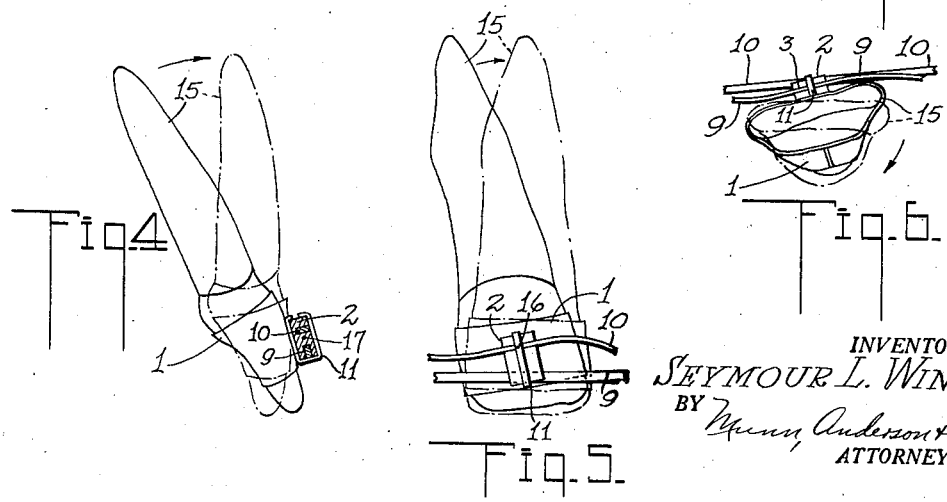
INVENTOR.
SEYMOUR L. WINSLOW
BY
ATTORNEYS.

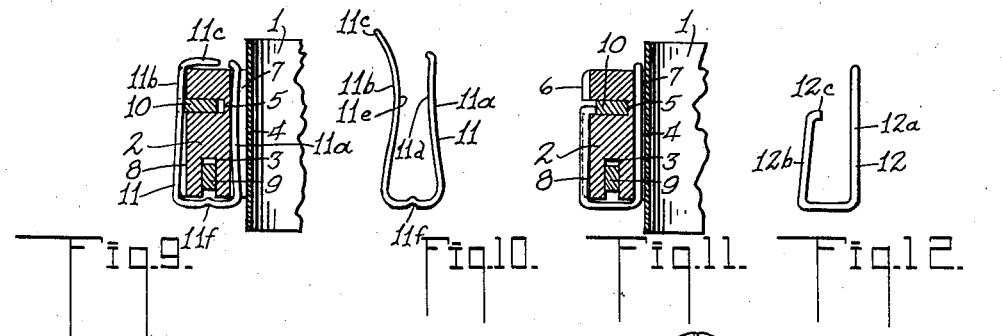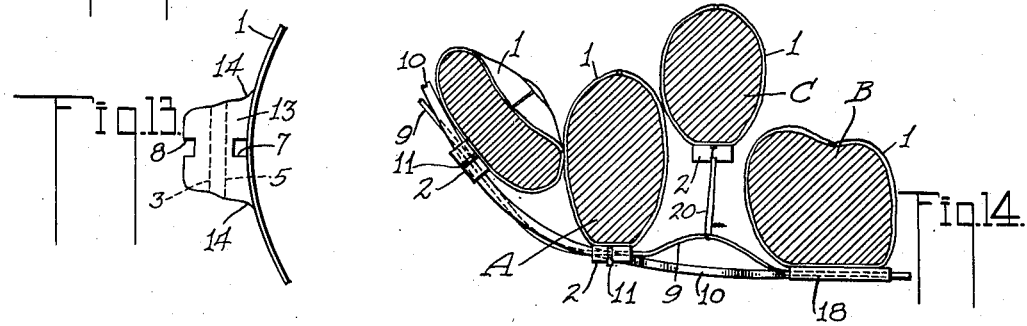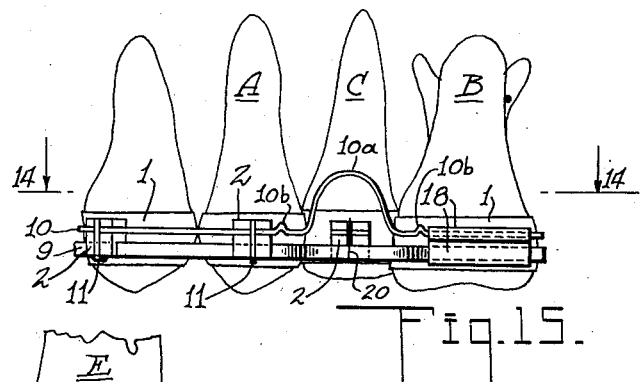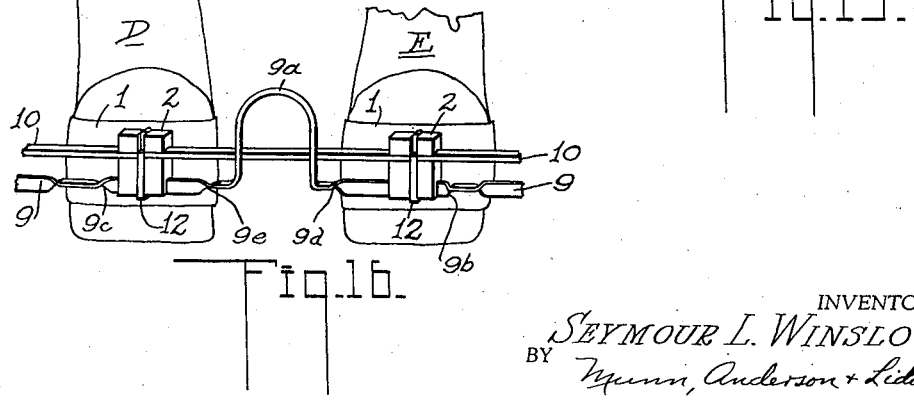

Patented Feb. 4, 1941

2,230,315

UNITED STATES PATENT OFFICE 2,230,315

ORTHODONTIC APPLIANCE

Seymour L. Winslow, Santa Rosa, Calif.

Application April 21, 1939, Serial No. 269,119

2 Claims. (Cl. 32—14)

My invention relates to improvements in an orthodontic appliance, and it consists of the combinations, constructions and arrangements hereinafter described and claimed.

The problem of aligning teeth is complicated by the fact that a tooth is a very delicate bony structure attached to the jaw bone by muscle-like tissues, which surround the root of the tooth. These tissues, known as the peridental membrane, are delicate and fibrous and are supplied with nutriment by tiny capillaries. They also have an extremely sensitive nerve supply. The main function of this membrane is to serve as a rubber-like separator between the root of the tooth and the jaw bone. The teeth therefore are not set in bone directly, but have an insulator to take up the vibrations, stresses, and strains of their normal function. Thus, this delicate tissue is similar and serves to a great extent the same purpose as the rubber insulation between a motor and the frame which supports it; the motor being the tooth and the jaw bone the supporting frame work.

Again the problem of aligning teeth is complicated in that when a pressure is exerted on a tooth in a normal human, to move it, the tooth moves against this membrane and compresses it and the portion of the membrane on the opposite side of the tooth expands. In a time, depending upon the reactive abilities of each individual, the cells (osteoclasts) which break down bone to soluble salts, start functioning on the side of the tooth where pressure is applied and the jaw bone is gradually dissolved on this side so that the tooth moves. The cells (osteoblasts) which build up bone, build up new bone as the pressure is relieved on the opposite side and the two groups of cells working together will move the tooth through the jaw bone. It is of utmost importance that the pressure applied, be such that the membrane will not be so badly compressed as to restrict the blood supply to the peridental membrane, for in the time elapsed between the application of pressure to move the tooth and the relief of that pressure by the dissolving of the bone so that the tooth may move, serious damage may occur to the peridental membrane. It is this excessive pressure on the membrane and the relief of that pressure when the jaw bone dissolves that usually causes the pain and discomfort to the movement of teeth for the membrane is richly supplied by nerves which react and cause pain when too great a pressure is applied. Also when this pressure on the tooth is relieved, the membrane goes through a healing stage during which time it is very sore and sensitive, and the patient may not be able to masticate (chew) a normal diet. Usually the pressures applied are often too great and they are not always under complete control, consequently they have to be of short duration to allow the tissues to recuperate and the pressure cannot again be applied until the soreness leaves and then the operation is repeated, resulting in a very lengthy period of treatment to accomplish the desired positioning of the teeth.

It would seem obvious from the nature of the phenomenon of the operation of the bone destroying cells (osteoclasts) and bone producing cells (osteoblasts), and also from the structure of the peridental membrane and its ability to be compressed to a point where the flow of blood is shut off, that the ideal nature of the pressure or force should be one that is so gentle as to only slightly compress the membrane and permit blood still to flow through its capillaries. The flow of blood to the membrane should be continuous so that once absorption and growth of bone is started around the tooth root by the bone destroying and bone building cells, the cells may receive nourishment continually so that they can continue this process until the tooth is in its correct position, and the pressure is relieved whereupon the cells become inactive. In this way, the patient does not experience the usual degree of pain during treatment and can eat as normal a diet as before the appliances were placed on the teeth. Also the fact that this pressure is continuous, the time of treatment is shortened considerably and the operator may only need to see the patient a few times, thus shortening the total hours of time with the case. Since the appliances will be on the teeth over a shorter period of time due to this arrangement, there is less possibility of damage to the enamel of the teeth by decay or wear. All this will greatly facilitate the art of orthodontia and render a greater service to many more patients with dentofacial deformities.

The position of each tooth to its adjacent tooth, the relation of all the teeth of each arch to each other, and the relation of one arch (upper) to the other (lower) complicates the problem still further. Thus it will be seen that the pressure produced on the teeth by the tendency of a tooth straightening wire to return to predetermined position must be light for one tooth yet much greater to change the shape of the arch where all of the teeth must move bodily as a unit. Up to the present time, attachments on the tooth bands consisting of arch bars exerted a force which was sufficient for the alignment of individual teeth, but which did not exert enough force for changing the shape of the entire arch, or on the other hand, they were large enough to change the shape of the entire arch, but they then produced too great a force on each individual tooth.

Thus it is obvious that what is most desirable is an appliance that will have the ability to exert a slight pressure on an individual tooth sufficient to move it gently and continuously by its tendency to return to a predetermined position and still have enough power to change the shape of the arch in any or all directions or dimensions. Obviously, the time of treatment is considerably shortened if all of these forces are continuously in operation at the same time.

The size of the wires or arch bars have been limited also by the fact that the patient eating a normal diet might bend the wires, if they were small, by the food striking the bars and causing permanent deformation. The wires would therefore cease to move the teeth correctly to their predetermined positions.

Modern scientific metallurgy has produced alloys or compounds which are non-corrosive in the mouth, and which when used in very small wires and attachments, resist bending which otherwise would permanently deform them, this bending being caused by the food striking against them during its normal mastication. These alloys are especially adaptable to the forming of tooth bands and when placed on the teeth, resist deformation to a greater extent and therefore prevent breakage and displacement during mastication which often causes decay, if not discovered immediately. The repair of broken tooth bands also consumes additional time and is discomforting to the patient. When cemented on a tooth their thermal co-efficient of expansion is extremely low and they do not become physically separated from the cement by expansion or contraction during temperature changes produced by various foods in the mouth. This type of band when properly formed and cemented to the tooth will give greater assurance of freedom from decay (decalsification) between the band and the tooth. Also the film of chromium oxide on the new alloy or compound forms a mirror-like surface free from pits and fissures and when polished, resists the growth of bacteria. The gum tissue and supporting structures remain healthy in contact with this alloy and the mouth as a whole is easy to keep clean and remains in a healthy condition. By virtue of the fact that the alloy offers a great resistance to electricity, it is a simple operation to spot-weld the joint on tooth bands that connects the ends together and thus eliminate the time involved in a soldering operation for the same purpose.

My invention relates generally to devices employed in the art of orthodontia, and is especially directed to the use of two arch bars, rectangular in cross section which when placed one at right angles to the other, will give the appearance and have the same general characteristics as a T bar. The means of detachably connecting these bars to the tooth bands consists of blocks permanently secured to the tooth bands, the blocks having arch bar receiving grooves cut therein. These grooves or cuts receive the two arch bars in such a manner that a cross section through the bars will resemble a T bar. The bars are separated slightly from each other by the body of the block which is necessary in order to give strength to the attachment. A spring clip yieldingly secures the bars to the block.

Other objects and advantages will appear in the following specification, and the novel features of the device will be particularly pointed out in the appended claims.

My invention is illustrated in the accompanying drawings forming a part of this application, in which:

Figure 1 is an occlusal plan view of the upper maxillary arch;

Figure 2 is a front elevation of the same arch;

Figure 3 is a side elevation;

Figure 4 is a side elevation of one tooth illustrating its rotation on its mesio-distal axis;

Figure 5 is a front elevation of a tooth illustrating its rotation on its bucco-lingual axis;

Figure 6 is a top plan view of the same tooth illustrating its rotation on a vertical axis;

Figure 7 is an enlarged isometric view of a portion of the device, showing the arch bars in angular positions;

Figure 8 is a view similar to Figure 7 and shows the arch bars in normal position;

Figure 9 is a vertical section through the block, taken along the line 9—9 of Figure 8;

Figure 10 shows the key used for yieldingly holding the arch bars in the block;

Figure 11 is a view similar to Figure 9, but illustrates a slightly different form of key;

Figure 12 shows the key used in Figure 11;

Figure 13 is a top plan view of a slightly modified form of block and tooth band;

Figure 14 is a section along the line 14—14 of Figure 15;

Figure 15 illustrates the method of moving two adjacent teeth further apart to permit an intermediate tooth to be moved into position; and Figure 16 is a side elevation illustrating the method of moving two adjacent teeth toward each other.

In carrying out my invention, I will first describe the particular construction of a tooth band and block provided for each tooth and then will set forth how the arch bars are yieldingly secured to the blocks for continuously exerting a force on the teeth to move them into proper relation to each other, this being achieved when the bars return to predetermined position. When the bars do return to predetermined position, the teeth will not only be in proper relation with respect to each other, but the entire dental arch will also be of the proper predetermined shape (viewed in three dimensions). The band shown at 1 in Figure 7 is adapted to encircle a tooth, see Figure 1, and to be cemented thereto. The band carries a block 2 which is permanently secured to the band, and care is taken when the band is attached to the tooth that the vertical axis of the block is parallel with the vertical axis of the tooth, and that the block is placed on the center of the tooth face. The block has an arch bar receiving groove 3 that parallels its rear face 4 and a second arch bar receiving groove 5 that extends inwardly from the front face 6 and is disposed at right angles thereto. The rear face 4 has a vertically disposed shallow groove 7 therein that extends throughout the height of the block and the front face 6 has a groove 8 positioned directly in front of the groove 7 and parallel thereto. The block 2 and band 1 are shown in a position in Figure 7 to be applied to a tooth in the upper maxillary arch. The block and band are inverted from that shown when applied to a tooth in the lower maxillary arch.

An arch bar 9 is removably disposed in the groove 3 while a second arch bar 10 is removably disposed in the groove 5. The arch bars 9 and 10 encircle the entire arch of teeth and are secured in place in a manner to be described. It will be noted that both bars are rectangular in cross section and that the bar 9 has its greatest width disposed in a vertical plane while the bar 10 has its greatest width disposed in a horizontal plane.

In Figures 9 and 10, I show a vertical section through the block 2 and illustrate the position of the arch bars 9 and 10 in the block. A clip or key 11 of the shape shown in Figure 10 is secured to the block by inserting the leg 11a of the clip in the groove 7 and moving the clip upwardly. The other leg 11b of the clip is slightly curved and is slidably received in the front block groove 8. A portion of the clip 11c disposed at the end of the leg 11b is annealed and is adapted to be bent as shown in Figure 9 to lock the clip to the block from displacement downward. It will be noted in Figure 9 that the width of the leg 11a is less than the depth of the groove 7 and that the point 11d directly opposite the point 11e, see Figure 10, is shaped so as to be a point of fulcrum for the entire body of the clip from 11e to 11d. This increases the effective length of the clip in exerting a spring tension against the bar 10 for yieldingly urging it into the slot 5.

The clip shown in Figures 9 and 10 is readily secured to and is removable from the block 2. In removing the clip, a sharp hooklike instrument (not shown) is inserted between the leg 11b and the body of the block 2 and is pulled forwardly thus deforming the clip whereupon it may be pulled out of the keyway or groove with a pair of pliers. The clip cannot become wedged in the keyway because no portion of the leg 11a is bent so as to become larger than the keyway. This overcomes the tiresome present-day practice of removing keys which have had their ends turned over after insertion in a keyway. New keys or clips 11 are used if the arch bars are removed and replaced. The indentation shown at 11f keeps this portion of the clip close to the bar 9 without hindering the springiness of the legs 11a and 11b. Without this indentation, the looped end of the clip would be disposed too far away from the block. If this portion were made flat, then the springiness of the clip would be lessened.

In Figures 11 and 12, I show the same block 2 secured to a band 1, but the clip 12 differs from the clip 11 in that the leg 12a is longer than the leg 12b and the latter leg carries a bent portion 12c that enters the slot 5 to hold the bar 10 in place. It will be noted that the clip 12 is slightly thicker in cross section than the clip 11 and that the leg 12a is approximately the same size as the keyway or groove 7. This clip is inserted in the same manner as the clip 10, but the bent portion 12c snaps into the slot 5 and yieldingly holds the bar 10 in place. This clip 12 is to be used when the tooth needs no rotation and is being moved bodily, or the tooth is serving as an anchorage to move other teeth as shown in Figure 16. The clip 12 does not yield as readily as clip 11.

It is possible to form the exterior surface of the block with a flanged base and to curve the sides slightly to eliminate food-catching recesses between the block and the band. In Figure 13, I show a block 13 similar to the block 2 except that it has flanged sides 14 that provide the block with a wider base and curved sides. This greatly strengthens the block and provides greater rigidity after it is permanently attached to the band 1 and gives the finished band a curvature which makes greater ease of adaption to the curvature of the crown of the tooth. The curved sides act as fillets and will strengthen the block near the inner ends of the grooves 3 and 5, preventing the grooves from being distorted. The block has vertical grooves 7 and 8 corresponding to the similarly numbered grooves in the block 2. In all respects, the block 13 functions the same as the block 2 and therefore needs no further description.

It is best to show how the two bars 9 and 10 cooperate with one another to rotate a tooth into proper position in relation to other teeth, this movement being about three different axes all perpendicular to each other if need be, and also to show how these bars will at the same time shape the arch in width and in vertical height, if needed. In Figures 4 to 6 inclusive, I show three different views of a tooth indicated generally at 15 and indicate by broken lines the final position into which the tooth is rotated.

In Figure 5 I show the front view of the tooth 15 and illustrate how it is necessary to rotate this tooth on its labial-lingual axis about a point 16 into the broken line position shown in the same figure. The horizontal bar 10 is used by reason of its greater resiliency in this dimension to rotate the tooth about this axis and the wire or bar in tending to return to a horizontal position continually acts upon the block 2 and the tooth 15 to return it to a proper vertical position. The position of the clip 11 in the center of the block allows the vertical bar 9 to remain in a horizontal position in this rotational movement as shown; for if the vertical bar 9 were bent into the curvature taken by the horizontal bar 10, the force exerted by the bar 9 would be too great and would cause damage to the peridental membrane. Also permanent set would take place in the vertical bar 9 due to this extreme bending and the resultant movement would therefore be very abrupt and of short duration.

In Figure 6 I illustrate a top plan view of the same tooth 15 and show how the vertical bar 9 exerts a rotative force on the tooth to swing it about its vertical axis until the tooth reaches the broken line position shown in the same figure. The vertical bar 9 is resilient in this dimension and when deflected into the groove 3 as shown, will return to its predetermined arch curvature and will continuously rotate the block 2 and the tooth on its vertical axis until the bar reaches this curvature. If the horizontal bar 10 were bent into its groove 5 with the same resultant curvature as the vertical bar 9, the rotative forces exerted by the bar 10 would be too great, and also permanent set would take place in the bar. This physical property would cause the bar to move abruptly and through only a short distance, causing pain and damage to the peridental membrane. The leg 11b of the clip 11 will yield as shown in Figure 7, and since the clip is positioned at the center of the block 2, it will permit the horizontal bar 10 to remain in approximately a predetermined arch form so that a permanent set will not take place and the bar may then perform the function of rotating the tooth 15 about the axis 16 as shown in Figure 5. Since the irregularity of the teeth is most pronounced with respect to their vertical axes, that is, they must usually be rotated to a greater extent about this axis into proper position, the yielding clip 11 allows a still greater degree of angle position between the bar 10 and the block 2 than would be possible if the clip were unyielding. The bar 10, therefore, will not interfere with the function of the bar 9 in rotating the teeth about their vertical axes even though the bar 10 is yieldingly connected to the block.

I will now show how the two bars 9 and 10 cooperate with one another to rotate the tooth on its mesio-distal axis as shown in Figure 4. This figure shows a side view of the tooth 15 and illustrates how the tooth is swung about its mesio-distal axis 17. The tooth is rotated about this axis by the tendency of the bar 10 to return to a predetermined horizontal position and by the tendency of the bar 9 to return to a predetermined vertical position. Since the mesio-distal rotative forces of both bars shown in Figure 4 would cause friction between the bar 9 and the walls of its groove 3 and the bar 10 and the walls of its groove 5, when the bars were rotating the block and tooth about its vertical axis and also about its labio-lingual axis respectively, stalemate would possibly occur, i. e., the bars would not slide into their grooves if it were not for another force urging the bar 10 into its groove. The yielding clip 11 prevents stalemate occurring between the bars and urges the bar 10 into its groove which automatically rotates the block 2 into a vertical position and the bar 9 in turn rotates the block into a predetermined mesio-distal arch curvature alignment. Thus these two rotations, plus the mesio-distal axis rotation, cooperate with one another to align the block and tooth in its proper position, viewed from three different sides.

It should be understood that the two arch bars 9 and 10 in tending to return to normal position, will exert simultaneous rotational forces on the tooth about three different axes all perpendicular to each other. The composite of these forces will cause the tooth to move in a direction which is a mean between the various forces. In other words, the tooth will be moving in a direction that will be the mean between the three different rotational forces shown in Figures 4, 5 and 6 and the tooth will finally come to rest in its movement when it reaches the dotted line positions shown in the three figures. In addition to these three rotational movements about three different axes all mutually perpendicular, it is possible for the bars 9 and 10 to bodily move the teeth in any one or more of six different directions or in a combination of two or more of these directions. This will be more clearly brought out in the following paragraphs.

I will now describe the function of each bar 9 and 10 in shaping the entire arch from the molar tooth to the central incisor in vertical bodily movement. The bars are slidably mounted in sleeves 18 anchored to the molars. As shown in Figure 3, the arch is too high in the anterior or front portion to describe a normal plane of occlusion. The normal plane of occlusion is shown at 10' in this figure. The vertical bar 9 having its greatest power to be utilized in this dimension, by reason of its ability to recover to its predetermined shape into which it was formed before insertion into the vertical grooves in all of the blocks 2 shown, will recover to the proper predetermined shape and form a normal plane of occlusion. In other words, the teeth at the front of the mouth will be moved bodily toward the line 10'. It must be understood that this bar 9 encircles the entire arch from molar to molar and will align the entire arch to a predetermined normal occlusal plane as that shown at 10', and at the same time the bar 9 will carry out its functional rotational movements on each individual tooth as shown in Figures 4, 5 and 6. So then the main functions of the bar 9 are to rotate individual teeth on their vertical axes, see Figure 6, and to assist the bar 10 to rotate one or more teeth on their mesio-distal axes, see Figure 4, and by its relatively greater power in its greatest cross sectional dimension to also correct the abnormal plane of occlusion by moving the teeth toward the line 10'. Note, however, that these functions cannot occur without the co-operation of the horizontal bar 10 and the position of the clips 11 in their respective blocks 2, which permit the vertical bar 9 to remain in a position relative to each block and tooth without causing permanent set to take place. For if the vertical bar 9 were rigidly secured to the blocks so that permanent set took place, there would be too great a pressure on individual teeth which would result in pain, and damage would also occur to the peridental membrane of each tooth so treated. Also, the bar 9 would not tend to recover automatically to the proper plane of occlusion.

As shown in Figure 1, the entire arch is too narrow from molar to molar and should be widened to the broken line 9'. Here the horizontal bar 10 with the greatest cross sectional dimension is disposed in position to be utilized for widening the arch and shaping it into a predetermined arch form, by its tendency to recover to a predetermined shape. It should be noted that the rotational functions by the bar 10 on individual teeth as illustrated in Figures 4 and 5 are carried out at the same time. The main functions of the horizontal bar 10 are to rotate the individual teeth on their labio-lingual axes, see Figure 5, to assist the vertical bar 9 to rotate one or more teeth on their mesio-distal axes, and to bodily move all or any section of the teeth away from the midplane of the arch to a predetermined arch width and form. Also the bar 10 may be used to bodily move the front teeth posteriorly as shown. Obviously the bar 10 may be used to move the posterior teeth bodily toward the midplane and any or all the anterior teeth forwardly or backwardly, if necessary.

It will be seen that if the two bars 9 and 10 are placed in the proper manner in the blocks 2, the entire treatment of moving the teeth into proper position will take place very slowly and without damage to the supporting structures of the teeth. Only a few visits to the dentist are necessary to be sure that every band 1 is tight on its tooth and that the bars 9 and 10 have not become accidentally disengaged from any of the blocks 2.

If the displacement of the teeth is very great, then one or more wire sizes are necessary to successively apply to the teeth before they are brought into their final position. To facilitate the problem of determining whether too much initial pressure is applied to the teeth by the bars, the following rule will be helpful. The bars 9 and 10 are placed in the blocks 2 with the fingers only, and if the bars, upon removal, show bends or points of permanent deformation, then too much pressure has been applied and bars slightly smaller in width should be tried. If the smaller bars do not show signs of permanent deformation, then they should be used and will partially correct the malalignment. When the partial correction is completed, the full size bars should be used to complete the straightening of the teeth. Thus by two or sometimes in badly malaligned cases, three or four changes of the bars, the condition will be corrected. If bars too large are used, they will cause excessive pressure and the clip will not hold. Thus the clip operates as a safety device, giving the operator a warning that the bars thus placed will cause excessive pressure and soreness and perhaps damage to the supporting tooth structures.

It will be noted that the bar 9 can move vertically a slight distance in the slot 3. This permits the bar 10 to move the teeth up or down as the case may be, toward the occlusal plane 10'. The free vertical play of the bar 9 permits the teeth to be held only by the rigidity of the bar 10 and it will be noted that the bar 10 is very flexible and resilient in a vertical direction. The free play of the bar 9 in the slot 3 permits the teeth to move up and down slightly when masticating and this stimulates the more normal flow of blood and increases the efficiency of the device. The device therefore does not interfere with the exercise of the tooth membrane which the membrane receives during the normal chewing operation. I have also found that the manipulation and movement of the device during normal chewing, permits the bars to be flexed over wider areas of angulation and still to effectively move the teeth into proper position. If the bars were rigidly secured to the teeth, this would not be possible.

The movement of the bar 9 in the slot 3 not only permits activity of the device while on the teeth, but the spring clip 11 is spaced slightly from the bar 9 and allows the bar to move vertically a slight distance. The horizontal bar 10 is more firmly held in position by the spring clip. A free slight movement of the bar 10 except for the yielding movement of the clip 11 is not desirable when the teeth are not in proper position because the teeth contact with the opposed teeth in the other maxillary arch, at an angle. When the teeth have been brought into proper position by the arch bars, the bar 10 will be in a horizontal position and the clip will allow a slight movement of the bar in a horizontal plane. The teeth therefore can move slightly in this direction during the normal chewing operation which is desirable to produce a healthy membrane and a firmer bone growth. The appliance is therefore automatically self-adjusting and this will reduce the number of visits the patient will need make to the dentist. The bars will apply a gentle and continuous pressure to the teeth to straighten them. The bars 9 and 10 provide sufficient power edgewise to correct the formation of the arch even while the rotation of each tooth is accomplished by a far less force.

In Figures 14 and 15, I illustrate the means for moving two teeth away from each other to make room for moving a third tooth between the first two, and I also show means for moving the third tooth into proper position. The teeth A and B have blocks 2 secured thereto by the band 1 and the arch bars 9 and 10 are passed through the grooves 3 and 5 in the blocks. It is necessary to move the teeth A and B away from each other in order to make room for the tooth C. In Figure 15, I show the horizontal arch bar 10 provided with a looped portion 10a and with stops 10b formed in the bar in any manner, such as by bending the bar in the manner shown. The arched portion 10a will exert a force against the teeth A and B to move them away from each other. In Figure 14, I show the arch bar 9 yieldingly connected to the tooth C by a ligature 20. The ligature 20 is a wire that is passed around the arch bar 9 and is also passed through the groove 7 in the block 2. The spring tendency of the arch bar 9 to return to normal position will create a sufficient force on the tooth C to move it gradually back into position. After the teeth A and B have been moved apart and the tooth C has been moved closer to the arch bar 9, the bar 9 and also the bar 10 can be placed in the grooves 3 and 5 of the block 2 that is attached directly to the tooth C, and this will cause the tooth to be finally brought into proper relation with respect to the teeth A and B.

In Figure 16, I illustrate a method for bodily moving two teeth together where this is required. In this figure, the teeth D and E are provided with bands 1 and blocks 2. The arch bar 10 is connected to the blocks and so is likewise the arch bar 9 by the clips 12 (not the clips 11). It will be noted that the bar 9 is provided with a looped portion 9a that will exert a force on both teeth to move them toward each other. The bar 9 is twisted at 9b and 9c for providing stops that will prevent the bar from sliding through the blocks. The bar 9 is also twisted at the points 9d and 9e for arranging the bar in the proper relation for forming the loop 9a. The legs of the loop 9a will try and move toward each other and will exert a continuous force on the blocks 2 attached to the teeth D and E for moving them toward each other. The bar 10 will hold the teeth D and E in correct vertical position so that the teeth will be moved bodily toward each other.

I have described how the blocks 2 are secured to the teeth in a predetermined manner and I have further described how the bars 9 and 10 are placed in the blocks and are yieldingly secured thereto by the clips 11. The tendency of the bars 9 and 10 to return to normal position will create a force which is sufficient to rock the teeth about one or more of three axes perpendicular to each other, should it be necessary to rotate the teeth, and the bars will also bodily move the teeth in one or more of six different directions, if this is necessary. In other words, the tendency of the bars to return to normal position will be sufficient to cause all of the teeth to be moved into place and to provide the proper curvature to the maxillary arch.

I have found that a bar circular in cross section cannot create a rotative force about its own axis to swing a tooth about a horizontal axis to properly position it in the jaw. The provision of two bars, both rectangular in cross section and both extending at right angles with respect to each other, solves the problem of rotating the teeth about three different axes, if it is necessary to so move the teeth, and of moving the teeth in one or more of six different directions, if that is also necessary. The spring clip 11 adds to the flexibility of the device and permits the bars to partially extend out of the grooves 3 and 5 at the initial installation of the device on the teeth. The saliva acts as a perfect lubricant on the bars and blocks, to permit relative movement therebetween during the adjustment of the teeth. The simple fact that both bars will try to assume normal predetermined positions is the only motive force used in continuously applying a very light pressure on the teeth for moving them into position. The force for moving the teeth will automatically stop when the teeth are in proper position because then the bars will also be in normal position and will cease exerting any more moving force on the teeth.

I also show means for making stops and springs out of the arch-bar itself (Figures 15 and 16), which eliminates any soldering, brazing or welding operations on the arch-bar. Such heating operations would change the physical characteristics of the bar at the area so heated, and it would not have the properties which are so valued in the bar prior to heating. This also saves time in that these stops or bends can be most readily produced by suitable pliers in the bar itself.

Thus I have shown that by the use of two arch-bars rectangular in cross section, and placed in the blocks as shown so as to have the appearance of a T-bar, individual teeth can be moved bodily in any or all of six different directions. The teeth also can be rotated about three different axes, all mutually perpendicular to one another, if need be. Also the shape of the entire arch may be changed in any or all of the three different dimensions.

For purposes of explanation, the mesio-distal axis is an axis through the tooth from the mesial surface to the distal surface. The bucco lingual axis extends through the tooth from the lingual (tongue) surface to the buccal (cheek) surface or lip surface.

While I have shown only the preferred form of my invention, it should be understood that various changes or modifications may be made within the scope of the appended claims without departing from the spirit of the invention.

I claim:

1. In an orthodontic appliance, the combination with a tooth band of a bracket secured on said band, an arch-bow passing through the upper portion of said bracket, there being a transversely disposed opening formed in the lower front portion of said bracket, a wire passing through said opening and there being two vertical grooves formed in said bracket in the front and back walls thereof.

2. In an orthodontic appliance, the combination with a tooth band of a bracket secured on said band, an arch-bow passing through the upper portion of said bracket, there being a transversely disposed opening formed in the lower front portion of said bracket, a wire passing through said opening, there being two vertically disposed grooves formed in said bracket in the front and back walls thereof, and means passing through said vertical grooves for securing the arch-bow and said wire to said bracket.

SEYMOUR L. WINSLOW.